United States Patent
Lindstrom et al.

(10) Patent No.: US 6,893,674 B2
(45) Date of Patent: May 17, 2005

(54) PROCESSED CHEESE MADE WITH SOY

(75) Inventors: Ted Riley Lindstrom, Lake Forest, IL (US); Isabelle Laye, Wheeling, IL (US); Glenn MacBlane, Chicago, IL (US); Fu-I Mei, Wheeling, IL (US)

(73) Assignee: Kraft Foods Holdings, Inc., Norhtfield, IL (US)

( * ) Notice: Subject to any disclaimer, the term of this patent is extended or adjusted under 35 U.S.C. 154(b) by 271 days.

(21) Appl. No.: 10/207,591

(22) Filed: Jul. 29, 2002

(65) Prior Publication Data
US 2004/0018292 A1 Jan. 29, 2004

(51) Int. Cl.[7] ............................................. A23C 19/00

(52) U.S. Cl. .................. 426/582; 426/580; 426/634; 426/656; 426/520

(58) Field of Search ........................... 426/580, 582, 426/586, 615, 629, 634, 656, 519, 520, 521, 522

(56) References Cited

U.S. PATENT DOCUMENTS

| | | | |
|---|---|---|---|
| 3,982,025 A | 9/1976 | Hashimoto et al. |
| 4,080,477 A | 3/1978 | Tsumura et al. |
| 4,303,691 A | 12/1981 | Sand et al. |
| 4,349,576 A | 9/1982 | Lehnhardt et al. |
| 4,678,676 A | 7/1987 | Ishizuka et al. |
| 5,858,449 A | 1/1999 | Crank et al. |

*Primary Examiner*—Leslie Wong
(74) *Attorney, Agent, or Firm*—Fitch, Even, Tabin & Flannery

(57) ABSTRACT

A method for preparing processed cheese containing significant levels of soy protein which possesses all of the melt, firmness, and flavor characteristics of regular processed cheese is provided. The method utilizes one or more emulsions containing dairy ingredients and a soy protein ingredient. The emulsion(s) are blended with natural cheese, and heated in the presence of emulsifying salts to form a homogeneous, pumpable fluid cheese material that may be formed into sheets, slices or other desired forms. Preferred sources of soy protein include soy protein concentrates and soy protein isolates. Process cheese products containing between about 9 to about 12 percent soy protein may be obtained.

23 Claims, 1 Drawing Sheet

PROCESSED CHEESE MADE WITH SOY

FIELD OF THE INVENTION

The present invention relates generally to a method of preparing a nutritionally modified processed cheese product. More particularly, the present invention relates to a processed cheese product enriched with high levels of soy protein which possesses all of the melt, firmness, and flavor characteristics of regular processed cheese.

BACKGROUND OF THE INVENTION

Processed cheese, widely available in sliced and loaf forms, has become one of the most popular selling cheese products. Processed cheese products are particularly popular with children. Therefore, opportunities to increase the nutritional values and/or health benefits of processed cheese products without significantly impacting the organoleptic properties of the resulting product would be highly desirable.

Process cheese is conventionally prepared by grinding, and/or mixing while heating, one or more varieties of milk fat-containing natural cheeses, such as, for example, Cheddar cheese, Colby cheese, Swiss cheese, Brick cheese, Muenster cheese, Pasta Filata cheese, washed curd, and granular curd cheese. The resulting cheese is then blended with other dairy products, such as non-fat dry milk and whey solids, and emulsifying salts, such as disodium phosphate, at temperatures which are sufficiently elevated to pasteurize the cheese, to produce a homogeneous, pumpable, fluid cheese material that may be formed into sheets, slices, or other desired forms.

There are three general types of process cheese: pasteurized process cheese, pasteurized process cheese food, and pasteurized process cheese spread. These process cheeses have certain characteristics that are desirable to cheese consumers. They all have a smooth, creamy texture and a slight firmness that is attributable to the presence of at least 20 percent fat in the process cheese formulation. Based on the Standards of Identity, the main differences between the three types of process cheese are their moisture and fat content, and the use of optional ingredients in their manufacture. These cheeses typically are made in large quantities using a horizontal cooker (sometimes called a laydown cooker). Often, the process cheese is then automatically packaged in airtight cartons.

The health benefits of soybeans have been known for some time. For centuries, soybeans have been the primary source of protein in Asian countries, and in recent years the popularity of soy-based products has increased in the United States. Along with a tendency to lower cholesterol levels, soybeans have recently been linked with, or suggested as having a possible role in, inhibiting cancerous or tumor cells. Additionally, soy protein contains an amino acid profile that is among the most complete of all vegetable protein sources, and resembles, with the exception of the sulfur-containing amino acids, the pattern derived from high-quality animal protein sources. Thus, efforts have been made to incorporate soy into a wide variety of foods.

It would therefore be desirable to provide a process cheese type product containing, significant levels of soy protein while maintaining with the flavor, texture and melt characteristics of processed cheese.

U.S. Pat. No. 3,982,025 (Sep. 21, 1976) provides a method for the production of a spreadable soy cheese product. An aged soy cheese (prepared by fermenting soy milk with a lactic acid cheese starter culture) is mixed with an edible oil (about 45 to about 60 weight percent based on the weight of dry solids in the soy cheese), emulsifying salts, and water under high shear and high temperature conditions. The resulting spread contains about 11 weight percent soy protein.

U.S. Pat. No. 4,080,477 (Mar. 21, 1978) relates to the production of a processed cheese-like product containing soy cheese. A casein-containing material (e.g., caseinates, dairy cheese, dairy cheese curd, whole milk solids, skim milk solids, and mixtures thereof) and an emulsifying salt are added to soy cheese curd under relatively high shear conditions while heating to about 50–85° C. Generally, the casein-containing material is present in an amount sufficient to provide at least one part by weight casein per 100 parts by weight soy cheese and preferably about one to ten parts by weight casein per 100 parts by weight soy cheese.

U.S. Pat. No. 4,303,691 (Dec. 1, 1981) provides a proteinaceous food product simulating cheese comprising a blend of soy protein (e.g., soy isolate, cold insoluble soy fraction, or mixtures thereof), gelatin, hydrocolloid gum, fat, and water.

U.S. Pat. No. 4,349,576 (Sep. 14, 1982) provides a method for producing soy isolates. The soy isolates can be used to replace about 20–60 percent caseinate in a meltable imitation cheese.

U.S. Pat. No. 4,678,676 (Jul. 7, 1987) provides a method of producing a cheese-like emulsified food by blending tofu, an oil or fat, a heat coagulable protein (e.g., whey protein concentrate), and a stabilizer and then heating the blend to gel the protein component.

U.S. Pat. No. 5,858,449 (Jan. 12, 1999) provides an isoflavone-enriched soy protein product which can be incorporated into, for example, imitation processed cheese spreads. Such spreads were produced by first preparing a dry blend of rennet casein, soy protein product, and whey. Separately, a blend of oil, water, and emulsifying salts were mixed in a processed cheese cooker. The dry blend and lactic acid were added slowly to the mixture in the cheese cooker, and the resulting mixture was heated to produce a soy-based imitation processed cheese spread.

Although these methods generally provide soy in a cheese-like product, it is still desirable to provide significant levels of soy protein in a product which more closely mimics the flavor and textural attributes of typical dairy-based processed cheese products. The present invention provides organoleptically pleasing processed cheese products having significant levels of soy protein.

SUMMARY OF THE INVENTION

The present invention provides a method to produce a processed cheese product containing significant levels of soy protein. The product of the current invention is produced by subjecting a mixture of soy protein, a dairy protein, a dairy fat, and water to high-shear to form an aqueous emulsion. The aqueous emulsion is blended with natural cheese and emulsifying salts, and heated to form a homogeneous, pumpable, fluid cheese material that may be formed into sheets, slices, or other desired forms.

In an alternate embodiment of the current invention, a first emulsion is formed by homogenizing a mixture of a soy protein source, whey, water and milkfat. A second emulsion containing a milk protein source, milkfat, a food grade acid, and water is formed without homogenization. The two emulsions are mixed with natural cheese in a blender, and then cooked in the presence of emulsifying salts to produce a homogenous, pumpable, fluid cheese material that may be formed into sheets, slices or other desired forms.

Optional ingredients such as flavors, spices, or other foods may also be added to the cheese mixture, to provide a flavored process cheese or process cheese combined with other foods. Process cheese products containing between about 9 to about 12 percent soy protein while maintaining the desired organoleptic properties of process cheese may be produced by the process of the current invention.

DETAILED DESCRIPTION OF THE INVENTION

The present invention provides a method of producing processed cheese with significant levels of soy protein. The soy-containing processed cheese product is made by: (1) blending a soy protein ingredient, dairy ingredients, and water, and homogenizing the blend at about 1500 to about 5000 psi to form an emulsion; (2) blending the emulsion with a natural cheese, (3) heating the blend of the emulsion and the natural cheese to about 165 to about 180° F. in the presence of emulsifying salts to form the soy protein containing process cheese product; and (4) packaging the soy-containing process cheese product. In an alternate embodiment of the method of the current invention, a soy-containing processed cheese product is made by: (1) blending a soy protein ingredient, whey, water, and milkfat, and homogenizing the blend at about 1500 to about 5000 psi to form a first emulsion; (2) blending a milk protein source, milkfat, a food grade acid, and water to form a second emulsion; (3) mixing the first and second emulsions with natural cheese to form a blend; (4) heating the blend with emulsifying salts to about 165 to about 180° F. to form the soy-containing process cheese product; (5) packaging the soy-containing process cheese product.

The soy-containing processed cheese product of the current invention contains about 10 to about 36 percent natural cheese, about 10 to about 15 percent of a soy-containing ingredient, about 16 to about 34 percent dairy ingredients, about 2 to about 3 percent emulsifying salts, about 0.8 to about 2 percent salt and about 40 to about 50 percent water. More preferably, the soy-containing process cheese product contains about 10 to about 15 percent natural cheese, about 13 to about 15 percent soy-containing ingredient, about 20 to about 33 percent dairy ingredient, about 2.5 to about 2.7 percent emulsifying salts, about 1 to about 1.2 percent salt, and about 44 to about 46 percent water. The soy-containing processed cheese may optionally contain conventional process cheese additive ingredients, for example, food-grade acidulents and binding agents such as starches or gums.

Figure 1:
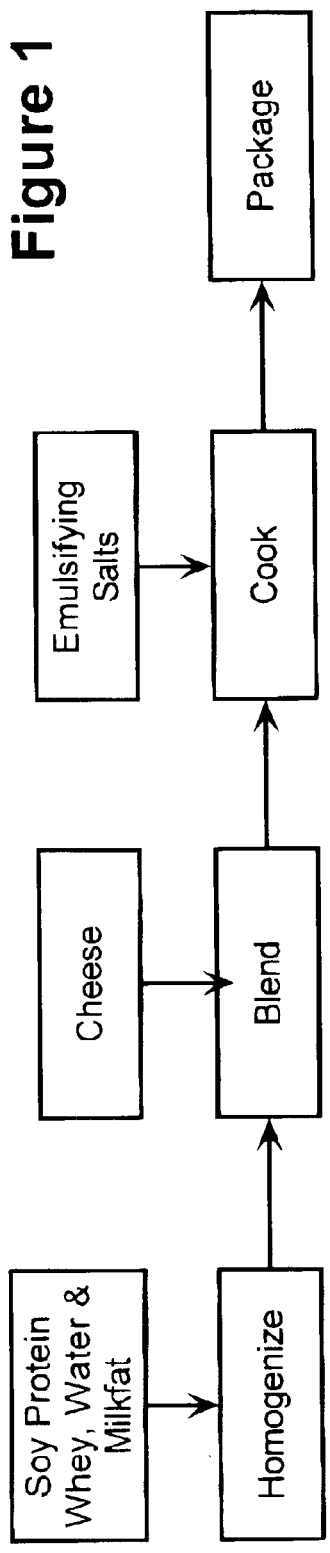
FIG. 1 is a flowchart illustrating one embodiment of the current invention.

One preferred embodiment, depicted in FIG. 1, starts with a mixture of soy protein, whey, water, and milkfat. This mixture is emulsified in a homogenizer at 3000 psi. Next, the homogenized mixture is blended with natural cheese in a blender, preferably a ribbon blender. The mixture is then transferred to a cooker where it is heated to about 165 to about 180° F. for about 0.5 to about 5 minutes in the presence of emulsifying salts to form a homogeneous mass. The product is then packaged (e.g., loaf or slice form).

Figure 2:
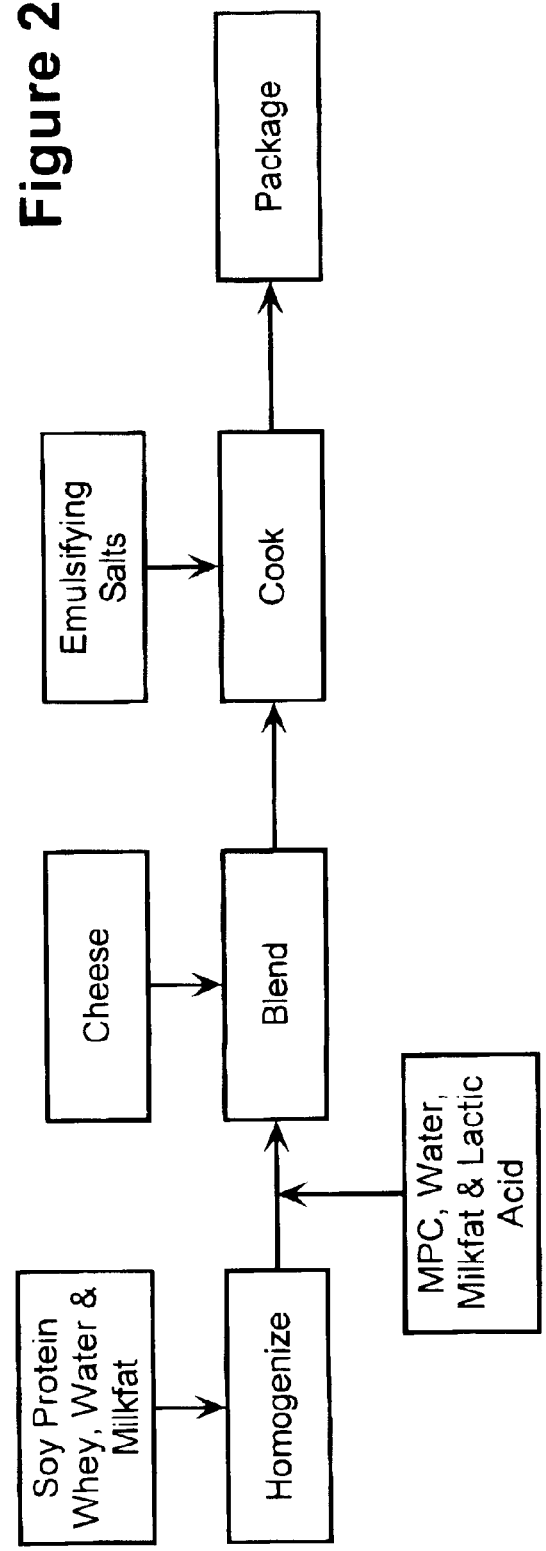
FIG. 2 is a flowchart illustrating another embodiment of the current invention.

A second embodiment of the present invention is depicted in FIG. 2. In the process of FIG. 2, two dairy emulsions are prepared and blended with natural cheese to produce the final product. The first emulsion is prepared by blending a soy protein ingredient, whey, water, and milkfat and homogenizing the mixture at a pressure of 3000 psi. A second emulsion is prepared by mixing milk protein concentrate, water, milkfat, and lactic acid in a Breddo Likwifier mixer. The first and second emulsions are blended with natural cheese in a blender, preferably a ribbon blender. This mixture is transferred to a cooker, where it is heated to about 165 to about 180° F., in the presence of emulsifying salts to form a homogeneous mass. The product is then packaged in suitable or desired forms (e.g., slice or loaf form).

The soy protein ingredients used to practice the invention include conventional and commercially available soy concentrates and isolates. Especially preferred soy isolates contain about 84 to about 90 percent protein, about 1 to about 3 percent fat, about 0.1 to about 4 percent carbohydrate, and about 0.1 to about 0.3 percent dietary fiber. Especially preferred soy concentrates contain about 60 to about 75 percent protein, 0 to about 2 percent fat, about 20 to about 26 percent carbohydrate, and about 18 to about 26 percent dietary fiber. Suitable soy concentrates and soy isolates are available commercially from, for example, Protein Technologies International (St. Louis, Mo.) and ADM (Decatur, Ill.).

Natural cheeses suitable to practice the current invention include any conventionally produced natural cheese except soft cheeses, (i.e., cottage cheese, cream cheese, and Neuchatel cheese). Especially preferred cheeses for use in the current invention include Cheddar cheese, Colby cheese, Swiss cheese, Brick cheese, Muenster cheese, Pasta Filata cheese, washed curd, and granular curd cheese.

A wide variety of dairy protein ingredients can be employed in the process of the invention. These dairy ingredients include non-fat dry milk (NFDM), whey powders, casein, and milk protein powders or concentrates. Preferred dairy protein ingredients are commercially available as milk protein concentrate under tradenames ALAPRO 4850 (MPC85), ALAPRO 4700 (MPC70), ALAPRO 4560 (MPC56), ALAPRO 4420 (MPC42), and ALAPRO 4424 from New Zealand Milk Products, Inc. (New Zealand), and MPC80, MPC56, and MPC42 from Murray Goulburn (Australia); mixtures can also be used if desired. These dairy ingredients may also be prepared by conventional procedures known by those of skill in the art. The dairy ingredients are generally characterized by their milk protein content. For example, MPC70 contains about 70 percent of crude protein. Generally, commercial milk protein powders contain about 1 percent fat.

The dairy protein ingredients employed in the process of the invention generally range from about 7 to about 20 percent of the total weight of the soy-containing processed cheese product, and preferably range from about 9 to about 12 percent.

A wide variety of milkfats can be employed in the process of the invention. These milk fats include cream, dried sweet cream, anhydrous milk fat, concentrated milk fat, and mixtures thereof. Such milk fats are commercially available from sources known by those of skill in the art, such as, for example, Kraft Foods, Inc. (Northfield, Ill.), Land O'Lakes (Tulare, Calif.), Dairy Gold (Kilmallock, Ireland), New Zealand Milk Products, Inc. (Victoria, Australia), and Dairy Farmers of America (Dairy Farmer Coop.—telephone number (888) 385-4711).

The milk fat employed in the process of the invention generally ranges from about 2 to about 20 percent of the total weight of the cheese product or process cheese base being produced, and preferably ranges from about 7 to about 12 percent.

Any edible acid may be used in the process of the invention, such as lactic acid, acetic acid, citric acid, and the like; lactic acid is generally preferred.

The emulsifying agents employed in the manufacture of processed cheeses are generally one or mixtures of two or more of the following: monosodium phosphate, disodium phosphate, dipotassium phosphate, trisodium phosphate, sodium metaphosphate, sodium hexametaphosphate, sodium acid pyrophosphate, tetrasodium pyrophosphate, sodium aluminum phosphate, sodium citrate, potassium citrate, calcium citrate, sodium tartrate, and sodium potassium tartrate.

It is contemplated that a wide variety of other edible natural or artificial flavors and ingredients may, optionally, be employed in the process of the invention. Such ingredients include any edible substance which, either alone, or in combination with other ingredients, imparts a desirable taste, color, and/or other benefit to the cheese product or process cheese base being manufactured. The amount and type of these ingredients that may be employed in the process of the invention depend upon the desired color and flavor of the final cheese product or process cheese base being produced.

The following examples are included to illustrate the invention and not to limit it. Unless otherwise stated, all percentages are by weight.

EXAMPLE 1

An emulsion containing 7.6 pounds soy protein isolate, 5.3 pounds dry whey, 17.2 lbs water, and 6.5 pounds milkfat was mixed in a high-shear mixer and homogenized in a two-stage homogenizer at 2500 psi and 500 psi. The emulsion was blended with 25.2 pounds natural cheese. The blend was transferred into a cooker, mixed with 1.9 pounds of emulsifying salts (i.e., disodium phosphate, monosodium phosphate, and sodium chloride), and cooked to 175° F. for 1 minute. The cooked emulsion was then hot-packed into both loaf and sliced forms. The resulting product had a penetrometer firmness of 11 mm (using a Precision Scientific Universal Penetrometer with a 41.3 g aluminum cone). Normally, conventional process cheese has a penetrometer firmness value ranging from about 10 mm (very firm) to about 18 mm (very soft). A grilled cheese sandwich made from the sliced form had a good melt rating of 2.5 on a subjective scale of 0 (no change in shape) to 5 (cheese liquefies and soaks into bread).

EXAMPLE 2

Two separate emulsions were made in a high-shear mixer. The first emulsion was prepared by mixing 7.6 pounds soy protein isolate, 5.3 pounds dry whey, 17.2 pounds water, and 6.5 pounds milkfat, and homogenizing in a 2-stage homogenizer at 2500 psi, and 500 psi. The second emulsion was prepared by mixing 5.5 pounds of milk protein concentrate, 5.9 pounds of water, 6.2 pounds of milkfat, and 0.2 pounds of lactic acid to adjust the pH. The second emulsion was not homogenized. Both emulsions were then blended with 10.2 pounds natural cheese. The blend was transferred into a cooker, mixed with 1.9 pounds of emulsifying salts (i.e., disodium phosphate, monosodium phosphate, and sodium chloride), and heated to 175° F. for 1 minute. The final cooked emulsion was then hot-packed into both loaf and sliced forms. The resulting loaf has a penetrometer firmness of 9 mm and a grilled cheese sandwich made from the sliced form had a good melt rating of 3 on the same 0 to 5 point scale as described in Example 1.

EXAMPLE 3

A low fat (about 6 percent) process cheese was made by combining 9.9 pounds soy isolate, 7.3 pounds dry whey, and 3.6 pounds maltodextrin (10 DE) with 28.4 pounds of water and homogenizing the mixture in a two stage homogenizer at 2500 psi and 500 psi. The homogenized mixture was blended with 7 pounds cheese, 1.5 pounds milk fat, and 5.5 pounds milk protein concentrate in a ribbon blender. The blend was transferred into a cooker, mixed with 2.5 pounds of emulsifying salts (disodium phosphate, citric acid, trisodium citrate, and sodium chloride), and heated to 175° F. for 1 minute. The final cooked emulsion was then hot-packed into both loaf and slice forms. The resulting loaf had a penetrometer firmness of 12.4 mm.

EXAMPLE 4

An emulsion was prepared by mixing 10.75 pounds soy protein concentrate, 26.7 pounds water, and 7.7 pounds milkfat, and then homogenizing them in a 2-stage homogenizer at 2500 psi, and 500 psi. The emulsion was then blended with 7 pounds natural cheese, 6.5 pounds milk protein concentrate, and 2.8 pounds dry whey in a ribbon blender. The blend was transferred into a cooker, mixed with 2.2 pounds of emulsifying salts (disodium phosphate, monosodium phosphate, sodium chloride), and heated to 175° F. for 1 minute. The final cooked emulsion was then hot-packed into both loaf and slice forms. The resulting loaf had a penetrometer firmness of 9.0 mm.

Detailed formulations are given below in Table 1 for each of the homogeneous soy-containing processed cheese products produced in Examples 1 to 4 above.

TABLE 1

|  | Amount (%) |
|---|---|
| Example 1 | |
| Cheese | 36.0 |
| Soy Isolate | 10.8 |
| Water | 32.1 |
| Dried Whey | 7.6 |
| Milk Fat | 9.3 |
| MSP | 0.3 |
| DSP | 2.4 |
| Salt | 1.2 |
| Sorbic Acid | 0.1 |
| Color | 0.04 |
| % Soy Protein | 9.1 |
| Example 2 | |
| Cheese | 10.3 |
| Soy Isolate | 10.8 |
| MPC | 7.9 |
| Water | 40.6 |
| Dried Whey | 7.6 |
| Milk Fat | 18.2 |
| MSP | 0.3 |
| DSP | 2.4 |
| Salt | 1.2 |
| Lactic Acid | 0.4 |
| % Soy Protein | 9.1 |
| Example 3 | |
| Cheese | 10 |
| Soy Isolate | 14.2 |
| MPC | 7.9 |
| Water | 46.6 |
| Maltodextrin | 5.2 |
| Dried Whey | 10.5 |
| Milk Fat | 2.2 |
| Sodium Citrate | 1.4 |
| Citric Acid | 0.5 |
| DSP | 0.6 |

TABLE 1-continued

|  | Amount (%) |
| --- | --- |
| Salt | 1.0 |
| % Soy Protein | 11.9 |
| Example 4 | |
| Cheese | 10 |
| Soy Concentrate | 15.3 |
| MPC | 9.3 |
| Water | 45.7 |
| Dried Whey | 4.1 |
| Milk Fat | 10.9 |
| MSP | 0.3 |
| DSP | 2.4 |
| Salt | 1.8 |
| % Soy Protein | 9.5 |

What is claimed is:

1. A method for producing a homogeneous soy-containing processed cheese product comprising:
   (i) mixing a soy protein source, a dairy protein source, and a dairy fat source to provide an emulsion base, wherein the soy protein source is soy protein concentrate, soy protein isolate, soy flour, soy grits, or mixture thereof;
   (ii) subjecting the emulsion base to high-shear mixing to form an emulsion;
   (iii) blending the emulsion with natural cheese and emulsifying agent to form a blend; and
   (iv) heating the blend for a time and at a temperature to form the homogeneous soy-containing processed cheese product.

2. The method of claim 1, wherein the dairy protein source is milk protein concentrate, whey protein concentrate, whey, concentrated milk, or mixtures thereof.

3. The method of claim 1, wherein the dairy fat source is cream, dried sweet cream, anhydrous milk fat, concentrated milk fat, or mixtures thereof.

4. The method of claim 1, wherein the emulsifying agent is disodium phosphate, monosodium phosphate, dipotassium phosphate, trisodium phosphate, sodium metaphosphate, sodium hexametaphosphate, sodium acid pyrophosphate, tetrasodium pyrophosphate, sodium aluminum phosphate, sodium citrate, potassium citrate, calcium citrate, sodium tartrate, sodium potassium tartrate, or mixtures thereof.

5. The method of claim 1 wherein the blend is heated to about 165 to about 180° F. for about 0.5 to about 5 minutes.

6. The method of claim 1 wherein the natural cheese is Cheddar cheese, Colby cheese, Swiss cheese, Brick cheese, Muenster cheese, Pasta Filata cheese, washed curd, granular cheese, or mixture thereof.

7. The method of claim 1 wherein the high shear mixing is carried out a pressure of about 1500 to about 5000 psi.

8. A method for producing a soy-containing processed cheese product comprising:
   (i) mixing a soy protein source, whey, water, and milkfat to form a first emulsion base; wherein the soy protein source is soy protein concentrate, soy protein isolate, soy flour, soy grits, or mixture thereof;
   (ii) subjecting the first emulsion base to high-shear mixing to form a first emulsion;
   (iii) mixing a milk protein source, milkfat, food grade acid, and water to form a second emulsion;
   (iv) blending the first and second emulsions with natural cheese and an emulsifying agent to form a mixture; and
   (iv) heating the mixture for a time and at a temperature to form the homogeneous soy-containing processed cheese product.

9. The method of claim 8, wherein the milk protein source is milk protein concentrate, concentrated milk, nonfat dry milk, whey protein concentrate, or mixtures thereof.

10. The method of claim 8, wherein the food grade acid is lactic acid, acetic acid, citric acid, phosphoric acid, or mixtures thereof.

11. The method of claim 9, wherein the food grade acid is lactic acid, acetic acid, citric acid, phosphoric acid, or mixtures thereof.

12. The method of claim 8, wherein the emulsifying agent is disodium phosphate, monosodium phosphate, dipotassium phosphate, trisodium phosphate, sodium metaphosphate, sodium hexametaphosphate, sodium acid pyrophosphate, tetrasodium pyrophosphate, sodium aluminum phosphate, sodium citrate, potassium citrate, calcium citrate, sodium tartrate, sodium potassium tartrate, or mixtures thereof.

13. The method of claim 9, wherein the emulsifying agent is disodium phosphate, monosodium phosphate, dipotassium phosphate, trisodium phosphate, sodium metaphosphate, sodium hexametaphosphate, sodium acid pyrophosphate, tetrasodium pyrophosphate, sodium aluminum phosphate, sodium citrate, potassium citrate, calcium citrate, sodium tartrate, sodium potassium tartrate, or mixtures thereof.

14. The method of claim 10, wherein the emulsifying agent is disodium phosphate, monosodium phosphate, dipotassium phosphate, trisodium phosphate, sodium metaphosphate, sodium hexametaphosphate, sodium acid pyrophosphate, tetrasodium pyrophosphate, sodium aluminum phosphate, sodium citrate, potassium citrate, calcium citrate, sodium tartrate, sodium potassium tartrate, or mixtures thereof.

15. The method of claim 8 wherein the mixture is heated to about 165 to about 180° F. for about 0.5 to about 5 minutes.

16. The method of claim 12 wherein the mixture is heated to about 165 to about 180° F. for about 0.5 to about 5 minutes.

17. The method of claim 14 wherein the mixture is heated to about 165 to about 180° F. for about 0.5 to about 5 minutes.

18. The method of claim 8, wherein said natural cheese is Cheddar cheese, Colby cheese, Swiss cheese, Brick cheese, Muenster cheese, Pasta Filata cheese, washed curd, granular cheese, or mixtures thereof.

19. The method of claim 15, wherein said natural cheese is Cheddar cheese, Colby cheese, Swiss cheese, Brick cheese, Muenster cheese, Pasta Filata cheese, washed curd, granular cheese, or mixtures thereof.

20. The method of claim 17, wherein said natural cheese is Cheddar cheese, Colby cheese, Swiss cheese, Brick cheese, Muenster cheese, Pasta Filata cheese, washed curd, granular cheese, or mixtures thereof.

21. The method of claim 8, wherein said high shear mixing is carried out at a pressure of about 1500 to about 5000 psi.

22. The method of claim 18, wherein said high shear mixing is carried out at a pressure of about 1500 to about 5000 psi.

23. The method of claim 20, wherein said high shear mixing is carried out at a pressure of about 1500 to about 5000 psi.

* * * * *

UNITED STATES PATENT AND TRADEMARK OFFICE
CERTIFICATE OF CORRECTION

PATENT NO. : 6,893,674 B2
DATED : May 17, 2005
INVENTOR(S) : Lindstrom et al.

It is certified that error appears in the above-identified patent and that said Letters Patent is hereby corrected as shown below:

Column 7,
Line 54, after "out", insert -- at --.

Signed and Sealed this

Eleventh Day of October, 2005

JON W. DUDAS
*Director of the United States Patent and Trademark Office*